(12) United States Patent
Park et al.

(10) Patent No.: US 11,289,765 B2
(45) Date of Patent: Mar. 29, 2022

(54) BATTERY HOUSING AND BATTERY MODULE COMPRISING SAME

(71) Applicant: LG CHEM, LTD., Seoul (KR)

(72) Inventors: Jin-Yong Park, Daejeon (KR); Jeong-O Mun, Daejeon (KR); Ho-June Chi, Daejeon (KR); Kyung-Mo Kim, Daejeon (KR); Seung-Joon Kim, Daejeon (KR); Jung-Been You, Daejeon (KR); Jung-Hoon Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 45 days.

(21) Appl. No.: 16/767,671

(22) PCT Filed: Mar. 4, 2019

(86) PCT No.: PCT/KR2019/002475
§ 371 (c)(1),
(2) Date: May 28, 2020

(87) PCT Pub. No.: WO2019/225838
PCT Pub. Date: Nov. 28, 2019

(65) Prior Publication Data
US 2020/0373528 A1 Nov. 26, 2020

(30) Foreign Application Priority Data

May 25, 2018 (KR) .................. 10-2018-0059804
Feb. 14, 2019 (KR) .................. 10-2019-0017321

(51) Int. Cl.
*H01M 50/209* (2021.01)
*H01M 50/211* (2021.01)
(Continued)

(52) U.S. Cl.
CPC ....... *H01M 50/209* (2021.01); *H01M 50/211* (2021.01); *H01M 50/258* (2021.01); *H01M 50/271* (2021.01); *H01M 2220/30* (2013.01)

(58) Field of Classification Search
None
See application file for complete search history.

(56) References Cited

U.S. PATENT DOCUMENTS 7,727,667 B2 * 6/2010 Sakurai ................ H01M 50/20
429/122
9,520,587 B2 12/2016 Dekeuster et al.
(Continued)

FOREIGN PATENT DOCUMENTS

CN 1596482 A 3/2005
CN 101315973 A 12/2008
(Continued)

OTHER PUBLICATIONS

Extended Eurcpean Search Report for Eucopean Application No. 19806938.7, dated Dec. 2, 2020.
(Continued)

*Primary Examiner* — Gregg Cantelmo
(74) *Attorney, Agent, or Firm* — Birch, Stewart, Kolasch & Birch, LLP

(57) ABSTRACT

Disclosed is a battery housing. The battery housing includes a plurality of covers coupled to each other to form a space in which the battery is accommodated, the plurality of covers having a first cover and a second cover disposed adjacent to the first cover and coupled to the first cover; and a coupling rod configured to couple the first cover and the second cover.

10 Claims, 10 Drawing Sheets

(51) Int. Cl.
*H01M 50/258* (2021.01)
*H01M 50/271* (2021.01)

(56) References Cited

U.S. PATENT DOCUMENTS

| | | |
|---|---|---|
| 2005/0164080 A1 | 7/2005 | Kozu et al. |
| 2008/0299453 A1 | 12/2008 | Shinyashiki et al. |
| 2009/0317715 A1 | 12/2009 | Jung et al. |
| 2011/0023290 A1 | 2/2011 | Shinyashiki et al. |
| 2012/0121956 A1 | 5/2012 | Park et al. |
| 2013/0084472 A1 | 4/2013 | Choi et al. |
| 2013/0084481 A1* | 4/2013 | Yoon .................... H01M 50/20 429/99 |
| 2013/0130073 A1 | 5/2013 | Kim et al. |
| 2013/0252058 A1 | 9/2013 | Kim |
| 2014/0106196 A1 | 4/2014 | Ahn et al. |
| 2014/0141297 A1 | 5/2014 | Zheng et al. |
| 2015/0104686 A1* | 4/2015 | Brommer ............ H01M 10/625 429/99 |
| 2015/0140409 A1* | 5/2015 | Sakurai ............... H01M 50/543 429/159 |
| 2016/0126531 A1 | 5/2016 | Kim et al. |
| 2016/0233465 A1 | 8/2016 | Lee et al. |
| 2016/0285060 A1 | 9/2016 | Okuda et al. |
| 2017/0237045 A1 | 8/2017 | Kim et al. |
| 2018/0108888 A1* | 4/2018 | Chen .................. H01M 10/0486 |
| 2018/0138559 A1* | 5/2018 | Omura ................ H01M 10/627 |
| 2019/0081295 A1* | 3/2019 | Nishimura ........ H01M 10/6554 |

FOREIGN PATENT DOCUMENTS

| | | | |
|---|---|---|---|
| CN | 201345382 Y | | 11/2009 |
| CN | 102468455 A | | 5/2012 |
| CN | 102959766 A | | 3/2013 |
| CN | 102970844 A | | 3/2013 |
| CN | 105322215 A | | 2/2016 |
| CN | 105470413 A | | 4/2016 |
| EP | 2405508 A1 | | 1/2012 |
| JP | 2004-63383 A | | 2/2004 |
| JP | 2006-147193 A | | 6/2006 |
| JP | 2008-210735 A | | 9/2008 |
| JP | 2016-66456 A | | 4/2016 |
| JP | 2017076507 A | * | 4/2017 |
| JP | 2017-117621 A | | 6/2017 |
| JP | 2017-168300 A | | 9/2017 |
| KR | 10-2005-0074199 A | | 7/2005 |
| KR | 10-0569133 B1 | | 4/2006 |
| KR | 10 0888283 B1 | | 3/2009 |
| KR | 10-2013-0056530 A | | 5/2013 |
| KR | 10-2013-0898573 A | | 9/2013 |
| KR | 10-2013-0107790 A | | 10/2013 |
| KR | 10-2014-0020796 A | | 2/2014 |
| KR | 10-2014-0074151 A | | 6/2014 |
| KR | 10-2014-0084595 A | | 7/2014 |
| KR | 10-2015-0057363 A | | 5/2015 |
| KR | 10-2017-0053434 A | | 5/2017 |
| KR | 10-2017-0054031 A | | 5/2017 |
| KR | 10-2018-0048100 A | | 5/2018 |

OTHER PUBLICATIONS

International Search Report (PCT/ISA/210) issued in PCT/KR2019/002475 dated Jun. 21, 2019.

* cited by examiner

US 11,289,765 B2

BATTERY HOUSING AND BATTERY MODULE COMPRISING SAME

TECHNICAL FIELD

The present application claims priority to Korean Patent Application No. 10-2018-0059804 filed on May 25, 2018 and Korean Patent Application No. 10-2019-0017321 filed on Feb. 14, 2019 in the Republic of Korea, the disclosures of which are incorporated herein by reference.

The present disclosure relates to a battery housing and a battery module including the battery housing, and more particular, to a battery housing, which may be simply manufactured, prevent thermal damage during a manufacturing process and reinforce rigidity, and a battery module including the battery housing.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, a separator interposed therebetween and an electrolyte. Depending on which material is used for the positive electrode active material and the negative electrode active material, the lithium secondary battery is classified into a lithium ion battery (LIB) and a polymer lithium ion battery (PLIB), or the like. Generally, an electrode of the lithium secondary battery is prepared by applying the positive or negative electrode active material to a current collector made of aluminum or copper sheet, mesh, film, foil, or the like and then drying the same.

Conventionally, a battery housing for protecting a secondary battery is fabricated by various welding methods such as laser welding. In other words, a plurality of members are bonded to each other through lap welding or butt welding to fabricate the battery housing. However, when the battery housing is manufactured by welding, the battery cells or peripheral parts disposed inside the battery housing may be damaged or deformed due to heat generated during welding. Also, as the welding region becomes longer, the weldability is deteriorated due to the deformation of members caused by accumulated heat.

DISCLOSURE

Technical Problem

Therefore, the present disclosure is directed to providing a battery housing, which may prevent battery cells or peripheral parts disposed therein from being damaged, and a battery module including the battery housing.

In addition, the present disclosure is directed to providing a battery housing, which may be easily bonded and have enhanced rigidity, and a battery module including the battery housing.

Technical Solution

In one aspect of the present disclosure, there is provided a battery housing for accommodating a battery, comprising: a plurality of covers coupled to each other to form a space in which the battery is accommodated, the plurality of covers including a first cover and a second cover disposed adjacent to the first cover and coupled to the first cover; and a coupling rod configured to couple the first cover and the second cover.

Also, the first cover may have at least one first insert hole into which one end of the coupling rod is inserted, and the second cover may have at least one second insert hole into which the other end of the coupling rod is inserted.

In addition, an adhesive may be injected into the first insert hole and the second insert hole so that the coupling rod is coupled to the first cover and the second cover.

Also, the first cover may have a placing groove in which the second cover is placed, and the first insert hole may be formed in the placing groove.

In addition, the second cover may have a protrusion protruding from an end thereof so that the protrusion is placed in the placing groove of the first cover, and the second insert hole may be formed in the protrusion.

Also, the second cover may have an end plate, and the protrusion may be formed to be bent from the end plate.

In addition, an accommodation groove may be formed in at least one of the first insert hole and the second insert hole.

Also, the accommodation groove may have a thread form.

Meanwhile, in another aspect of the present disclosure, there is also provided a battery module, comprising: a battery housing as described above; and a battery cell stack accommodated in the battery housing.

Meanwhile, in another aspect of the present disclosure, there is also provided a battery pack, comprising: a battery housing as described above; and a battery module accommodated in the battery housing.

Advantageous Effects

According to the embodiments of the present disclosure, since the covers are bonded using the coupling rod, heat is not generated when the covers are bonded, and it is possible to prevent battery cells or peripheral parts disposed in the battery housing from being damaged.

In addition, since the coupling rod is inserted into the covers, the covers may be easily bonded and have enhanced rigidity.

BEST MODE

Figure 1:
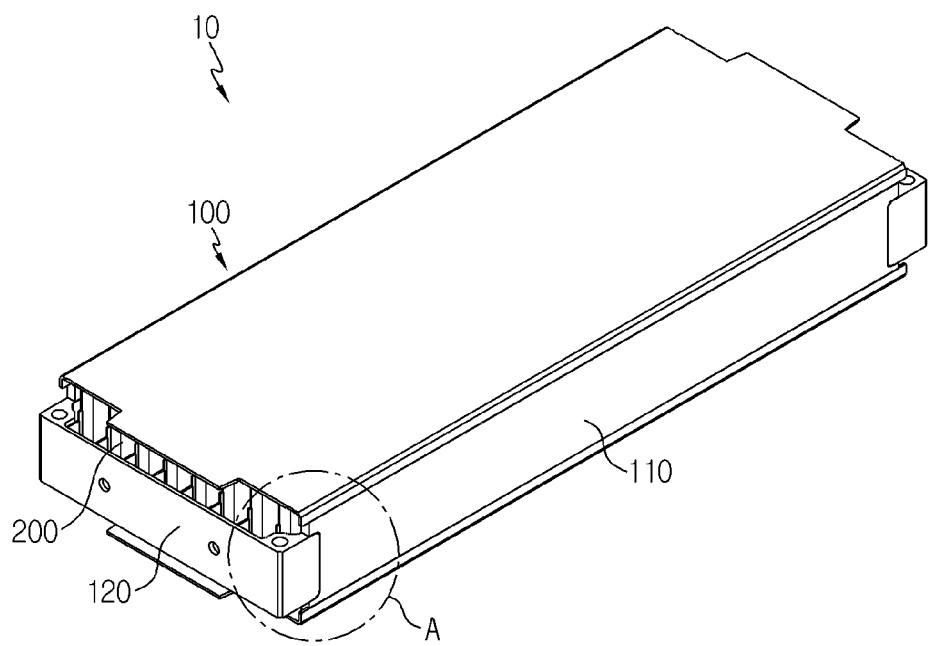
FIG. 1 is a perspective view showing a battery housing according to an embodiment of the present disclosure as a whole.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
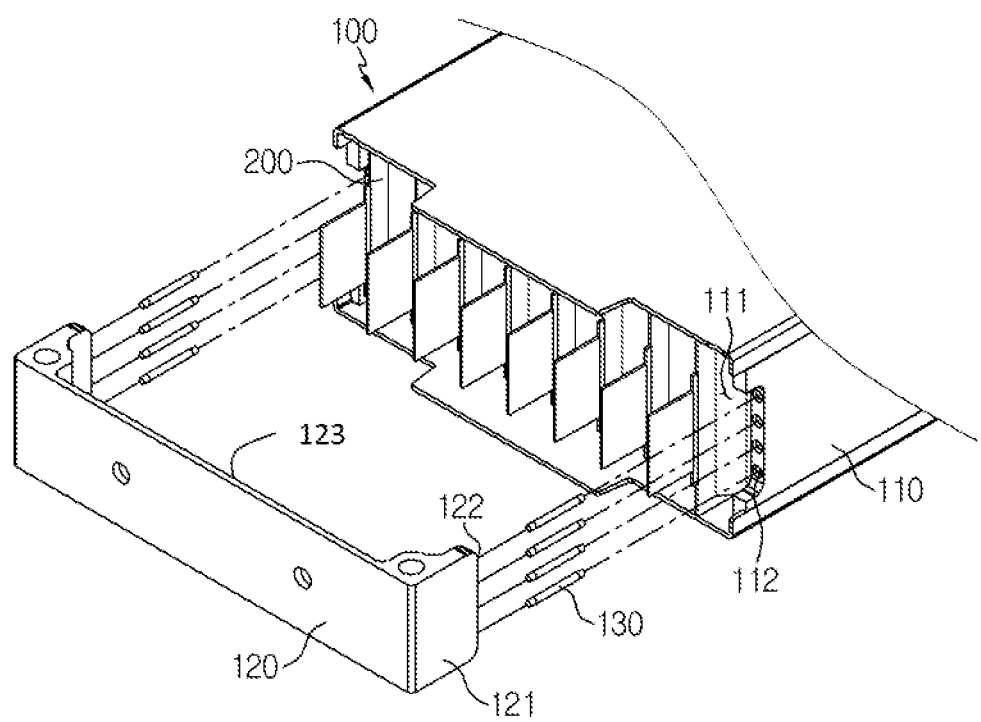
FIG. 2 is a partial perspective view showing the battery housing according to an embodiment of the present disclosure, from which a first cover and a second cover are disassembled.

FIG. 1 is a perspective view showing a battery housing according to an embodiment of the present disclosure as a whole, and FIG. 2 is a partial perspective view showing the battery housing according to an embodiment of the present disclosure, from which a first cover and a second cover are disassembled.

A battery housing 100 according to an embodiment of the present disclosure is provided to accommodate a battery. The battery housing 100 may be a module housing for accommodating a battery cell stack 200 or a pack housing for accommodating a battery module 10. Also, the battery housing 100 should be understood as including all kinds of housings capable of accommodating various kinds of batteries. Hereinafter, for convenience of explanation, the following description will be based on the case where the battery cell stack 200 is accommodated in the battery housing 100, but the scope of the battery housing 100 is not limited thereto.

The battery housing 100 includes a plurality of covers, and the plurality of covers are coupled to each other to form a space for accommodating the battery cell stack 200. That is, the battery cell stack 200 may be accommodated in an inner space formed by coupling the plurality of covers to each other, and the battery cell stack 200 may be protected by the plurality of covers. Here, the plurality of covers may include a first cover 110 and a second cover 120.

The battery housing 100 may include a first cover 110, a second cover 120, and a coupling rod 130.

The first cover 110 is any one of a plurality of covers, which may have various shapes. Referring to FIGS. 1 and 2, the first cover 110 may have a rectangular shape, for example. However, the shape of the first cover 110 is not limited thereto. In addition, the first cover 110 may be made of various materials. For example, a metal material such as aluminum or various composite resins such as plastics may be used.

The second cover 120 is disposed adjacent to the first cover 110 and coupled to the first cover 110. The second cover 120 may have a rectangular shape, similar to the first cover 110, and may be made of a metal material such as aluminum or various composite resins such as plastics. However, the shape and material of the second cover 120 are not limited thereto.

The coupling rod 130 may couple the first cover 110 and the second cover 120. The coupling rod 130 may be coupled to the first cover 110 and the second cover 120 in various ways. For example, a male screw or a female screw may be formed at the coupling rod 130, and a female screw or a male screw corresponding thereto may be formed at the first cover 110 and the second cover 120 such that the coupling rod 130 is coupled to the first cover 110 and the second cover 120. Alternatively, the coupling rod 130 may be fit into holes formed in the first cover 110 and the second cover 120. Alternatively, the coupling rod 130 may be coupled to the first cover 110 and the second cover 120 by means of an adhesive 140 (see FIG. 4). Here, the adhesive 140 includes all kinds of materials capable of attaching the same kind of materials or different kinds of materials to each other, including a bond. The following description will be based on the case where the coupling rod 130 is coupled to the first cover 110 and the second cover 120 by the adhesive 140.

Referring to FIG. 2, at least one first insert hole 112 may be formed in the first cover 110, and one end of the coupling rod 130 may be inserted into the first insert hole 112 of the first cover 110. In addition, one end of the coupling rod 130 inserted into the first insert hole 112 is fixed thereto by the adhesive 140. For example, the adhesive 140 may be injected into the first insert hole 112, one end of the coupling rod 130 may be inserted into the first insert hole 112, and then the adhesive 140 may be cured to fixedly couple one end of the coupling rod 130 to the first cover 110. Alternatively, one end of the coupling rod 130 may be inserted into the first insert hole 112 in a state where the adhesive 140 is applied to the coupling rod 130, so that one end of the coupling rod 130 is fixed to the first cover 110.

Also, the second cover 120 may have at least one second insert hole 122 formed therein, similar to the first cover 110, and the other end of the coupling rod 130 may be inserted into the second insert hole 122 of the second cover 120. In addition, the other end of the coupling rod 130 inserted into the second insert hole 122 is fixed thereto by the adhesive 140. For example, the adhesive 140 is injected into the second insert hole 122, the other end of the coupling rod 130 is inserted into the second insert hole 122, and then the adhesive 140 is cured to fixedly couple the other end of the coupling rod 130 to the second cover 120. Alternatively, the other end of the coupling rod 130 may be inserted into the second insert hole 122 in a state where the adhesive 140 is applied to the coupling rod 130, so that the other end of the coupling rod 130 is fixed to the second cover 120. The adhesive 140 may be injected into the first insert hole 112 and the second insert hole 122 or may be provided to surfaces of the first cover 110 and the second cover 120 so that the first cover 110 and the second cover 120 are attached to each other.

Referring to FIG. 2, the first cover 110 may have a placing groove 111, and the second cover 120 may be placed in the placing groove 111. If the first cover 110 has the placing groove 111 and the second cover 120 is placed in the placing groove 111 of the first cover 110 as described above, the first cover 110 and the second cover 120 may be coupled more stably. Here, the first insert hole 112 may be formed in the placing groove 111.

In addition, the second cover 120 may have a protrusion 121 protruding from an end thereof, and the protrusion 121 of the second cover 120 may be placed in the placing groove 111 of the first cover 110. Here, the second insert hole 122 may be formed in the protrusion 121.

The second cover 120 may include an end plate 123, and the protrusion 121 may be formed to be bent from the end plate 123. The end plate 123 of the second cover 120 has a flat shape, and both ends of the end plate 123 may be bent at substantially right angles to form the protrusion 121.

FIGS. 3 to 6 are cross-sectional views for illustrating a process of coupling the first cover and the second cover by a coupling rod, at the battery housing according to an embodiment of the present disclosure.

Hereinafter, the process of coupling the first cover 110 and the second cover 120 to each other by the coupling rod 130 at the battery housing 100 according to an embodiment of the present disclosure will be described with reference to FIGS. 3 to 6.

Figure 3:
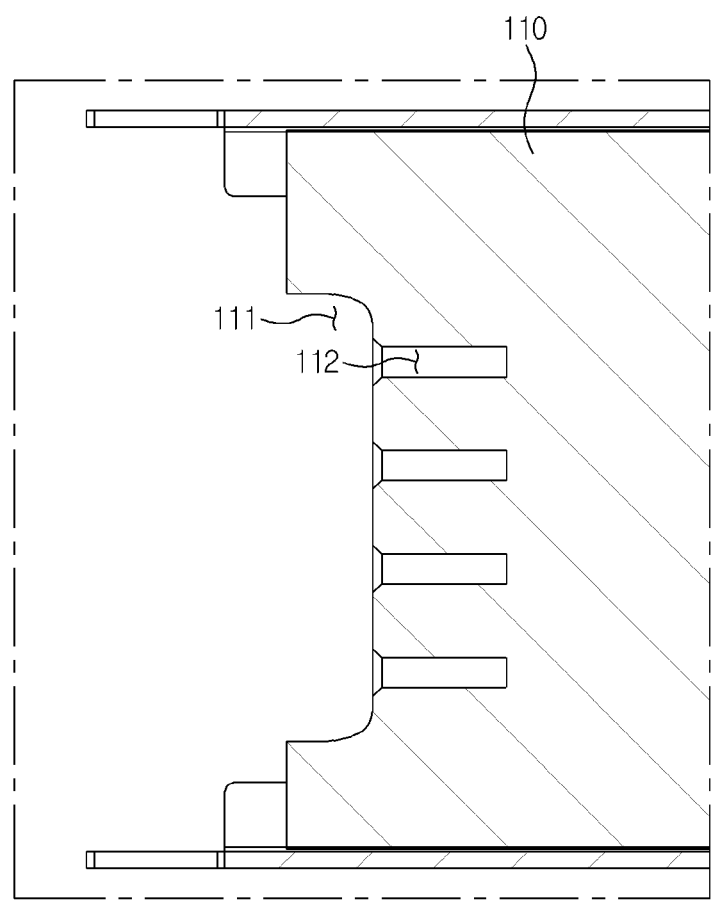
FIGS. 3 to 6 are cross-sectional views for illustrating a process of coupling the first cover and the second cover by a coupling rod, at the battery housing according to an embodiment of the present disclosure.
Figure 4:
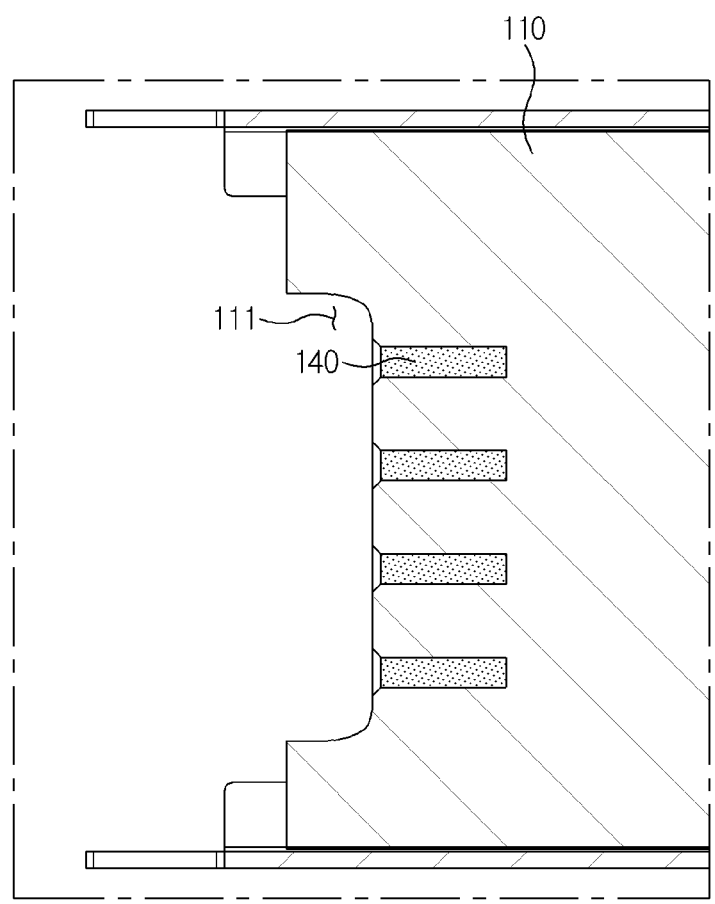

FIG. 3 is a cross-sectional view showing only one end of the battery housing 100, for example, showing only the first cover 110 in a portion A of FIG. 1. Referring to FIG. 3, the placing groove 111 is formed at the first cover 110, and four first insert holes 112 are formed in the placing groove 111 of first cover 110. Here, the number of the first insert holes 112 is only an example, and one or more first insert holes 112 may be provided. Referring to FIG. 4, the adhesive 140 is injected into the four first insertion holes 112 of the first cover 110. In addition, referring to FIG. 5, one ends of four coupling rods 130 are respectively inserted into the four first insertion holes 112 of the first cover 110, and if the adhesive 140 is cured, one ends of the coupling rods 130 may be fixed to the first cover 110 in a state of being inserted into the first insertion holes 112. In addition, the adhesive 140 is injected into four second insert holes 122 of the second cover 120. Also, referring to FIG. 6, the protrusion 121 of the second cover 120 is placed in the placing groove 111 of the first cover 110 and stably connected to the first cover 110. At this time, the other ends of the four coupling rods 130 are respectively inserted into the second insert holes 122 formed in the protrusion 121 of the second cover 120, and if the adhesive 140 is cured, the other ends of the coupling rods 130 may be fixed to the second cover 120 in a state of being inserted into the second insert holes 122. In this way, heat is not generated when the first cover 110 and the second cover 120 are bonded to each other, so it is possible to prevent the battery cells or peripheral parts disposed in the housing from being damaged. Also, the coupling rigidity of the first cover 110 and the second cover 120 may be enhanced by the coupling rod 130 inserted into the first cover 110 and the second cover 120. Meanwhile, in this embodiment, the number of the insert holes 112, 122 and the coupling rods 130 may be variously selected, without being limited to that shown in the figures.

FIGS. 7 to 10 are cross-sectional views for illustrating a process of coupling the first cover and the second cover by the coupling rod, at a battery housing according to another embodiment of the present disclosure.

Hereinafter, the function and effect of the battery housing 100 according to another embodiment of the present disclosure will be described with reference to FIGS. 7 to 10. However, the description commonly disclosed in the former embodiment will be replaced with the above description.

In this embodiment, an accommodation groove 115 or an accommodation groove 125 is formed in the first insert hole 112 or the second insert hole 122, different from the former embodiment.

Referring to FIGS. 7 to 10, the accommodation groove 115 may be formed in the first insert hole 112, or the accommodation groove 125 may be formed in the second insert hole 122. Here, the accommodation groove 115 or the accommodation groove 125 may have various shapes and may be formed to have, for example, a thread shape where thread ridges and thread valleys are repeated as shown in the figures. The following description will be based on the case where the accommodation groove 115 or the accommodation groove 125 has a thread shape as described above.

Here, in this embodiment, for example, only the accommodation groove 115 may be formed in the first insert hole 112, or only the accommodation groove 125 may be formed in the second insert hole 122. Alternatively, the accommodation grooves 115, 125 may be formed in both the first insert hole 112 and the second insert hole 122. If the accommodation groove 115 or the accommodation groove 125 is formed in the first insert hole 112 or the second insert hole 122, the contact area of the adhesive 140 with the first insert hole 112 or the second insert hole 122 increases compared to the case where the accommodation grooves 115, 125 are not formed, thereby increasing the adhesion area. Accordingly, the coupling force between the first cover 110 or the second cover 120 and the coupling rod 130 may be increased.

Figure 5:
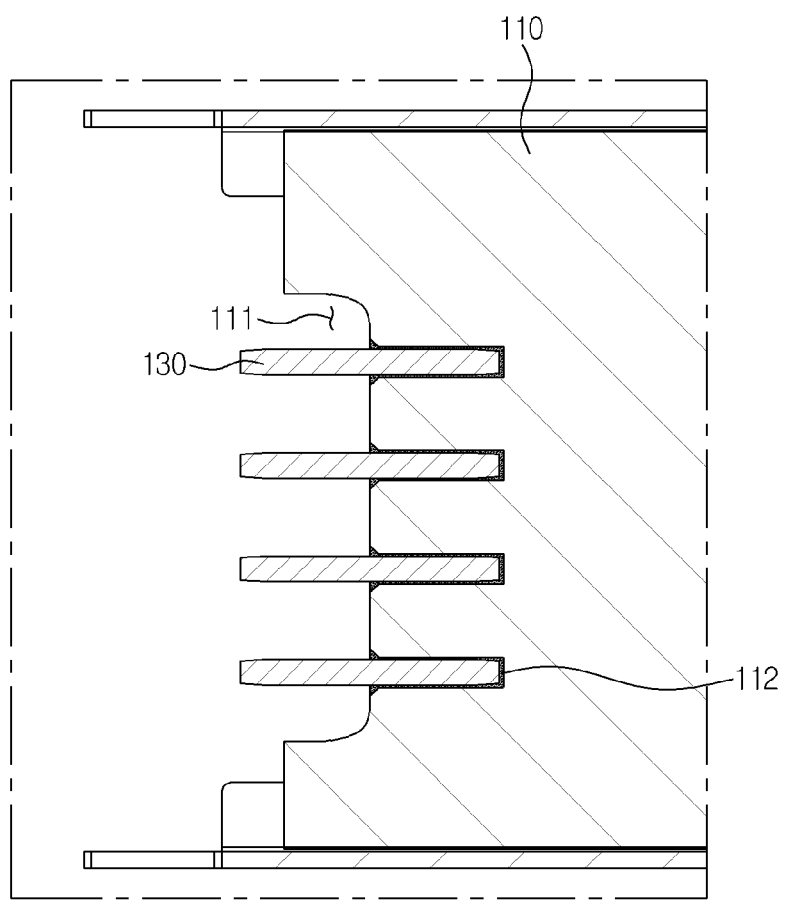
Figure 6:
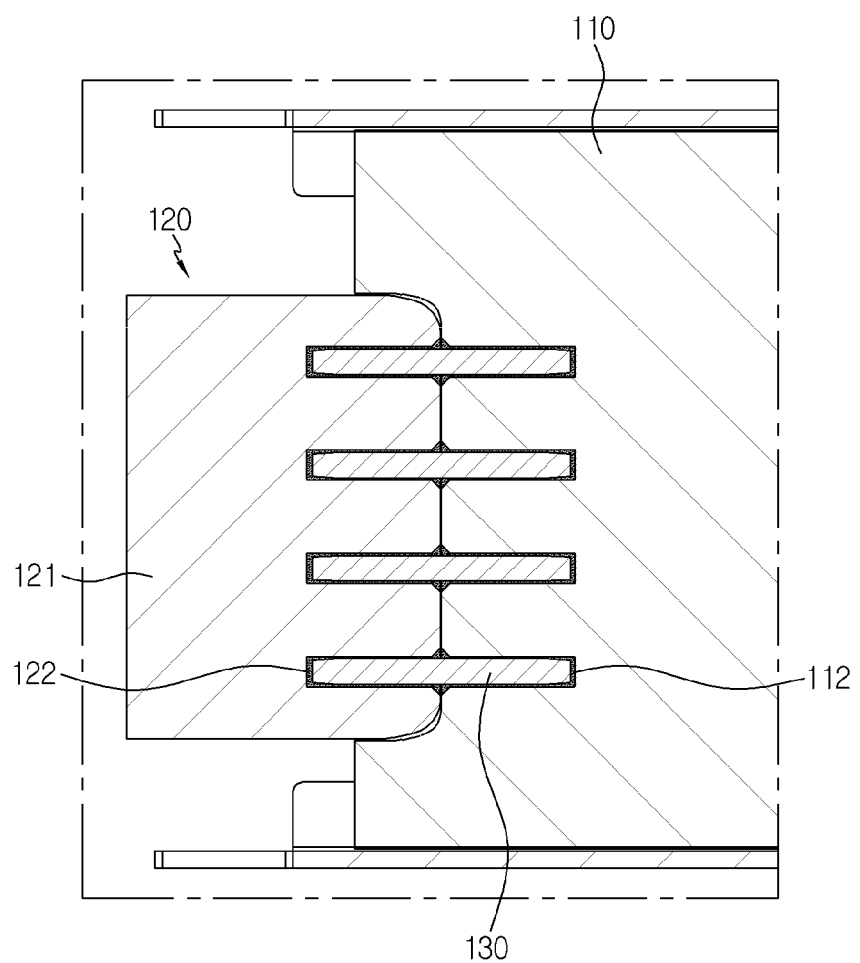
Figure 7:
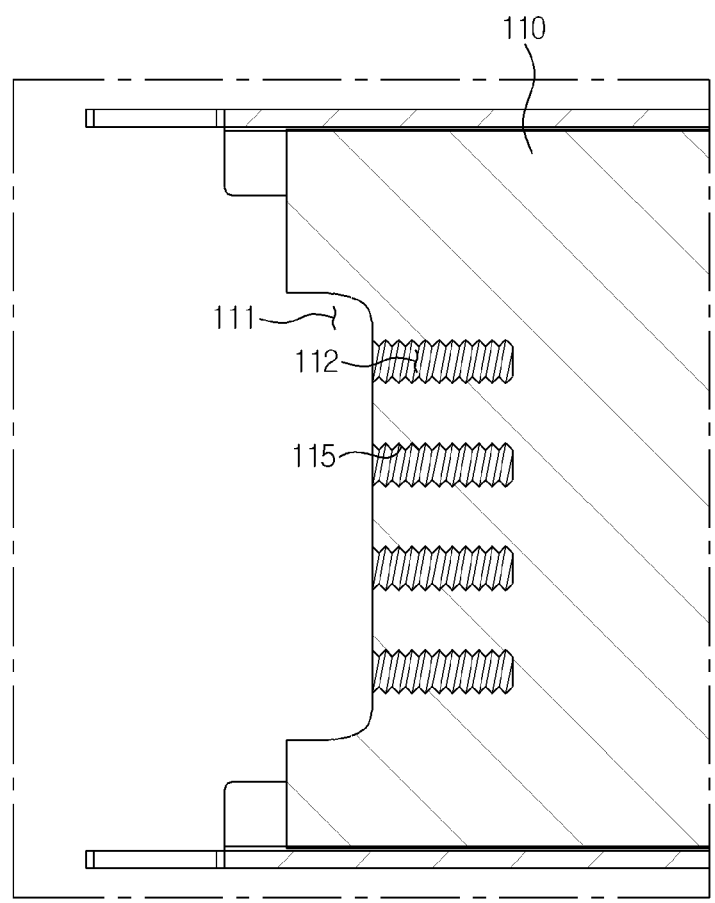
FIGS. 7 to 10 are cross-sectional views for illustrating a process of coupling the first cover and the second cover by the coupling rod, at a battery housing according to another embodiment of the present disclosure.
Figure 8:
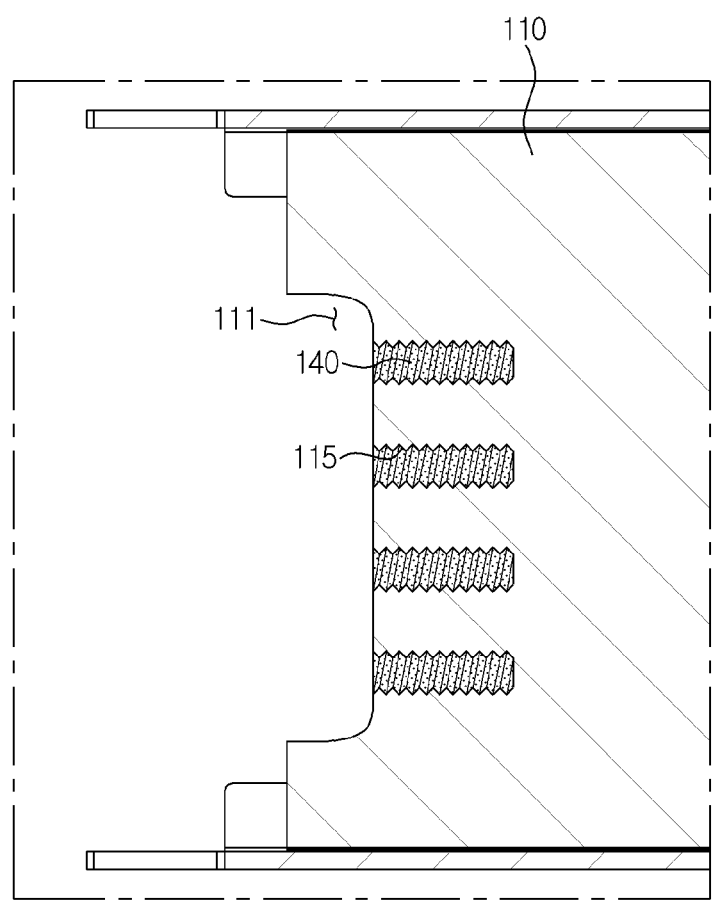
Figure 9:
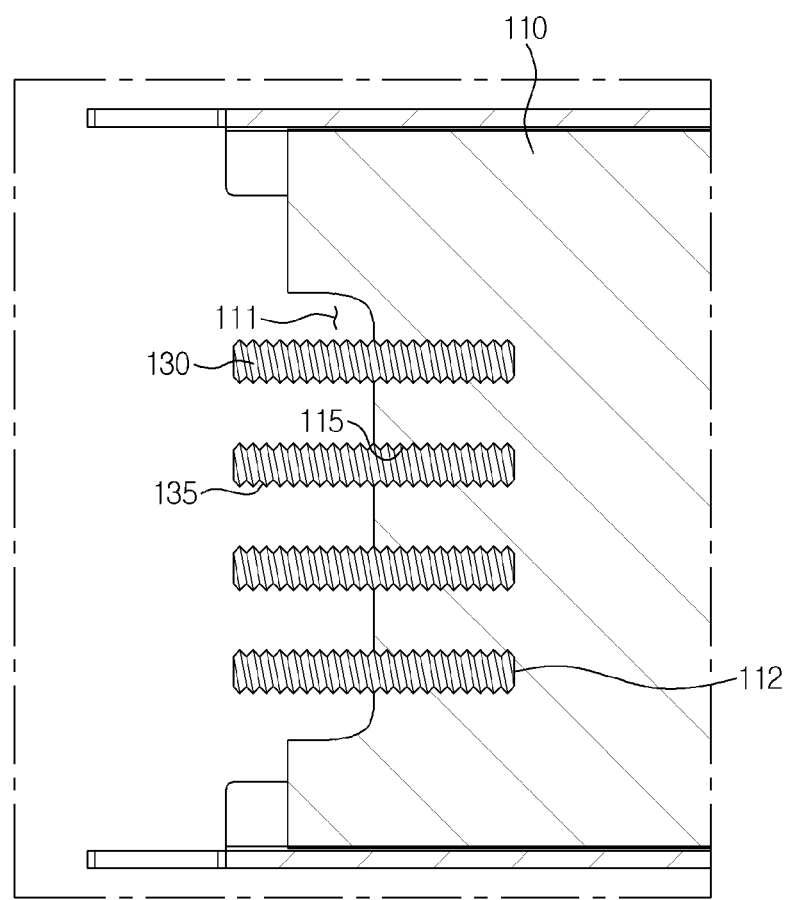
Figure 10:
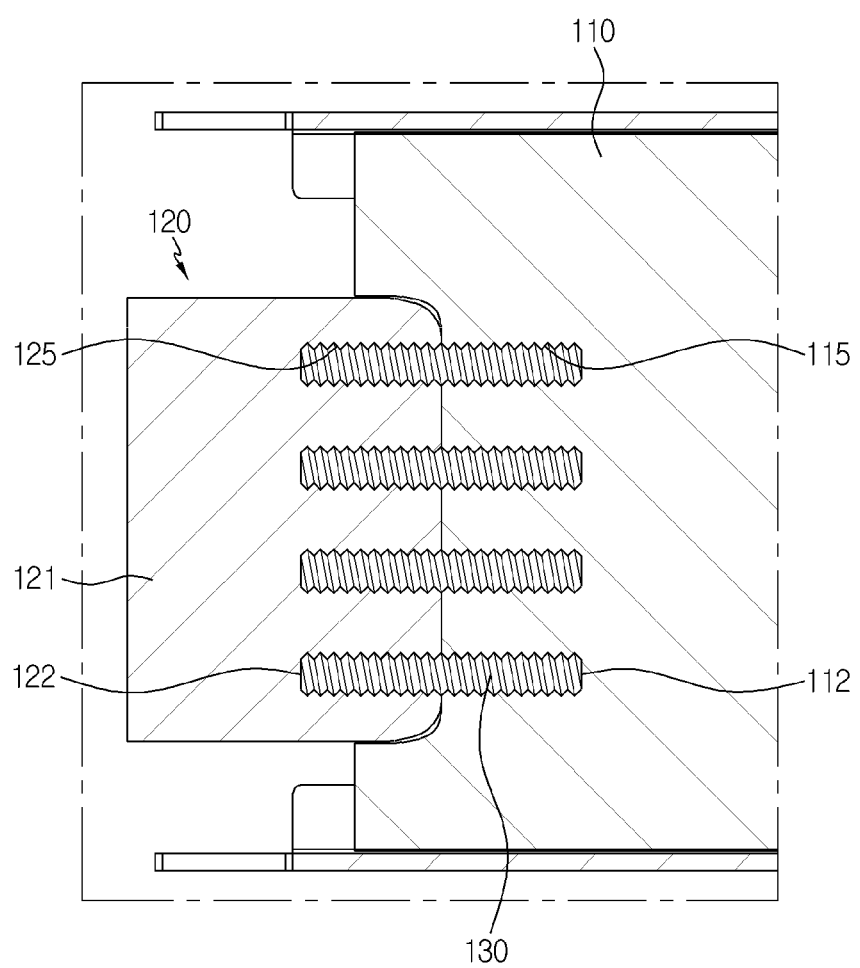

In addition, the coupling rod 130 may have a thread 135 where thread ridges and thread valleys are repeated (see FIGS. 9 and 10), and also the thread 135 may not be formed on the coupling rod 130 as shown in FIGS. 5 and 6. If the thread 135 is formed on the coupling rod 130, the thread 135 of the coupling rod 130 is screwed to the threaded accommodation groove 115, 125 formed in the first insert hole 112 or the second insert hole 122, and also the coupling rod 130 is coupled by the adhesive 140. Thus, the coupling force between the first cover 110 or the second cover 120 and the coupling rod 130 is significantly increased by the duplicated coupling, namely the coupling by the threads and the coupling by the adhesive 140. Here, the adhesive 140 is injected into the accommodation groove 115 of FIG. 9 and the accommodation grooves 115, 125 of FIG. 10. In addition, though not shown in the figures, even if the thread 135 is not formed on the coupling rod 130, if the accommodation groove 115 or the accommodation groove 125 is formed in the first insert hole 112 or the second insert hole 122 as described above, the contact area contact of the adhesive 140 with the first insert hole 112 or the second insert hole 122 is increased, compared to the case where the accommodation grooves 115, 125 are not formed, thereby increasing the adhesion area as a whole. Accordingly, the coupling force between the first cover 110 or the second cover 120 and the coupling rod 130 may be increased.

Meanwhile, referring to FIG. 1, the battery module 10 according to an embodiment of the present disclosure may include the battery housing 100 according to an embodiment of the present disclosure as described above, and a battery cell stack 200 accommodated in the battery housing 100. The battery cell stack 200 includes a plurality of battery cells, which respectively have electrode leads. The electrode lead is a kind of terminal exposed to the outside and connected to an external device and may be made of a conductive material. The electrode lead may include a positive electrode lead and a negative electrode lead. The positive electrode lead and the negative electrode lead may be disposed at opposite sides of the battery cell in the longitudinal direction thereof, or the positive electrode lead and the negative electrode lead may be disposed at the same side of the battery cell in the longitudinal direction thereof. The electrode may be electrically connected to the bus bar. The battery cell may have a structure in which a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell stack 200 may be configured such that a plurality of battery cells are stacked on each other. Here, the battery cell may have various structures, and the plurality of battery cells may be stacked in various ways.

The battery cell stack 200 may include a plurality of cartridges (not shown) for accommodating the battery cells, respectively. Each cartridge (not shown) may be fabricated by injection-molding plastic, and a plurality of cartridges (not shown) having an accommodation portion for accommodating the battery cell may be stacked. A cartridge assembly in which a plurality of cartridges (not shown) are stacked may include a connector element or a terminal element. The connector element may include various types of electrical connecting components or connecting components for connecting to, for example, a battery management system (BMS) (not shown) capable of providing data on voltage or temperature of the battery cells. In addition, the terminal element includes a positive electrode terminal and a negative electrode terminal as main terminals connected to the battery cell, and the terminal element may have a terminal bolt to be electrically connected to the outside. Meanwhile, the battery cell may have various shapes. Also, in the battery cell stack 200, battery cells may be bonded by a double-sided tape and stacked on each other. The battery housing 100 included in the battery module 10 according to an embodiment of the present disclosure has the function of a module housing that accommodates the battery cell stack 200.

Meanwhile, a battery pack (not shown) according to an embodiment of the present disclosure, may include the battery housing and the battery module 10 accommodated in the battery housing. Also, in addition to the battery modules 10, the battery pack (not shown) may further includes various devices for controlling charge and discharge of the battery modules 10, such as a BMS, a current sensor, a fuse, and the like. Here, the battery housing included in the battery pack has the function of the pack housing that accommodates the battery module 10.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure relates to a battery housing and a battery module including the battery housing and is particularly applicable to an industry related to a secondary battery.

What is claimed is:

1. A battery housing for accommodating a battery, the battery housing comprising:
    a plurality of covers coupled to each other to form a space in which the battery is accommodated, the plurality of covers including a first cover and a second cover disposed adjacent to the first cover and coupled to the first cover; and
    a coupling rod configured to couple the first cover and the second cover,
    wherein the first cover has a first insert hole into which one end of the coupling rod is inserted, and the second cover has a second insert hole into which the other end of the coupling rod is inserted, and
    wherein each of the first insert hole and the second insert hole are formed partially into the respective first cover and second cover, and does not penetrate through the respective first cover and the second cover.

2. The battery housing according to claim 1, further comprising an adhesive injected into the first insert hole and the second insert hole so that the coupling rod is coupled to the first cover and the second cover.

3. The battery housing according to claim 1,
    wherein the first cover has a placing groove in which the second cover is placed, and the first insert hole is formed in the placing groove.

4. The battery housing according to claim 3,
    wherein the second cover has a protrusion protruding from an end thereof so that the protrusion is placed in the placing groove of the first cover, and the second insert hole is formed in the protrusion.

5. The battery housing according to claim 4,
    wherein the second cover has an end plate, and
    wherein the protrusion is formed to be bent from the end plate.

6. The battery housing according to claim 1,
    wherein an accommodation groove is formed in one of the first insert hole and the second insert hole.

7. The battery housing according to claim 6,
    wherein the accommodation groove has a thread form.

8. A battery module, comprising:
    the battery housing according to claim 1; and
    a battery cell stack accommodated in the battery housing.

9. A battery pack, comprising:
    the battery housing according to claim 1; and
    a battery module accommodated in the battery housing.

10. The battery housing according to claim 1, wherein each of the first insert hole, the second insert hole, and the coupling rod is provide in a plurality, and
    respective one of the plurality of coupling rods are inserted into respective one of the plurality of first insert holes and respective one of the plurality of second insert holes.

* * * * *